(12) United States Patent
Fetzer et al.

(10) Patent No.: US 11,783,038 B2
(45) Date of Patent: Oct. 10, 2023

(54) DEVICE AND METHOD FOR COMPUTER-AIDED PROCESSING OF DATA

(71) Applicant: Technische Universitat Dresden, Dresden (DE)

(72) Inventors: Christof Fetzer, Dresden (DE); Franz Gregor, Dresden (DE)

(73) Assignee: Technische Universitat Dresden, Dresden (DE)

( * ) Notice: Subject to any disclaimer, the term of this patent is extended or adjusted under 35 U.S.C. 154(b) by 99 days.

(21) Appl. No.: 17/357,528

(22) Filed: Jun. 24, 2021

(65) Prior Publication Data
US 2021/0406038 A1    Dec. 30, 2021

(51) Int. Cl.
| | |
|---|---|
| *G06F 21/57* | (2013.01) |
| *G06F 9/445* | (2018.01) |
| *G06F 21/64* | (2013.01) |
| *G06F 9/455* | (2018.01) |
| G06F 30/20 | (2020.01) |
| H04L 67/00 | (2022.01) |
| H04L 9/40 | (2022.01) |

(52) U.S. Cl.
CPC .......... *G06F 21/57* (2013.01); *G06F 9/44505* (2013.01); *G06F 9/45504* (2013.01); *G06F 21/64* (2013.01); G06F 30/20 (2020.01); H04L 63/08 (2013.01); H04L 67/34 (2013.01)

(58) Field of Classification Search
CPC .. G06F 9/44505; G06F 9/45504; G06F 30/20; G06F 21/64; G06F 21/57; H04L 67/34; H04L 63/08
See application file for complete search history.

(56) References Cited

U.S. PATENT DOCUMENTS

| | | | |
|---|---|---|---|
| 7,587,592 B2 | 9/2009 | Watanabe et al. | |
| 10,554,643 B2 | 2/2020 | Venkataramana et al. | |
| 2005/0160045 A1* | 7/2005 | Watanabe | H04L 67/34 705/51 |
| 2015/0058949 A1* | 2/2015 | Collinge | H04L 63/08 726/7 |
| 2020/0076804 A1 | 3/2020 | Jevans | |
| 2021/0138651 A1* | 5/2021 | Mcgregor | G06F 30/20 |

OTHER PUBLICATIONS

Nerot Sebastien, KR 20160136386, "Securing of the Loading of Data Into a NonVolatile Memory of Secure Element" (translation), Nov. 29, 2016, 18 pgs <KR_20160136386.pdf>.*

* cited by examiner

*Primary Examiner* — Tuan A Vu
(74) *Attorney, Agent, or Firm* — BARNES & THORNBURG LLP; Jeffrey R. Stone

(57) ABSTRACT

A device and a method for computer-aided processing of data are disclosed, the method including: providing configuration data of an application, determining a first application identification, wherein the first application identification is assigned to the application, determining a configuration identification, wherein the configuration identification is assigned to the configuration data of the application, individualizing the data by means of a second application identification, wherein the second application identification is determined using the first application identification and the configuration identification.

10 Claims, 6 Drawing Sheets

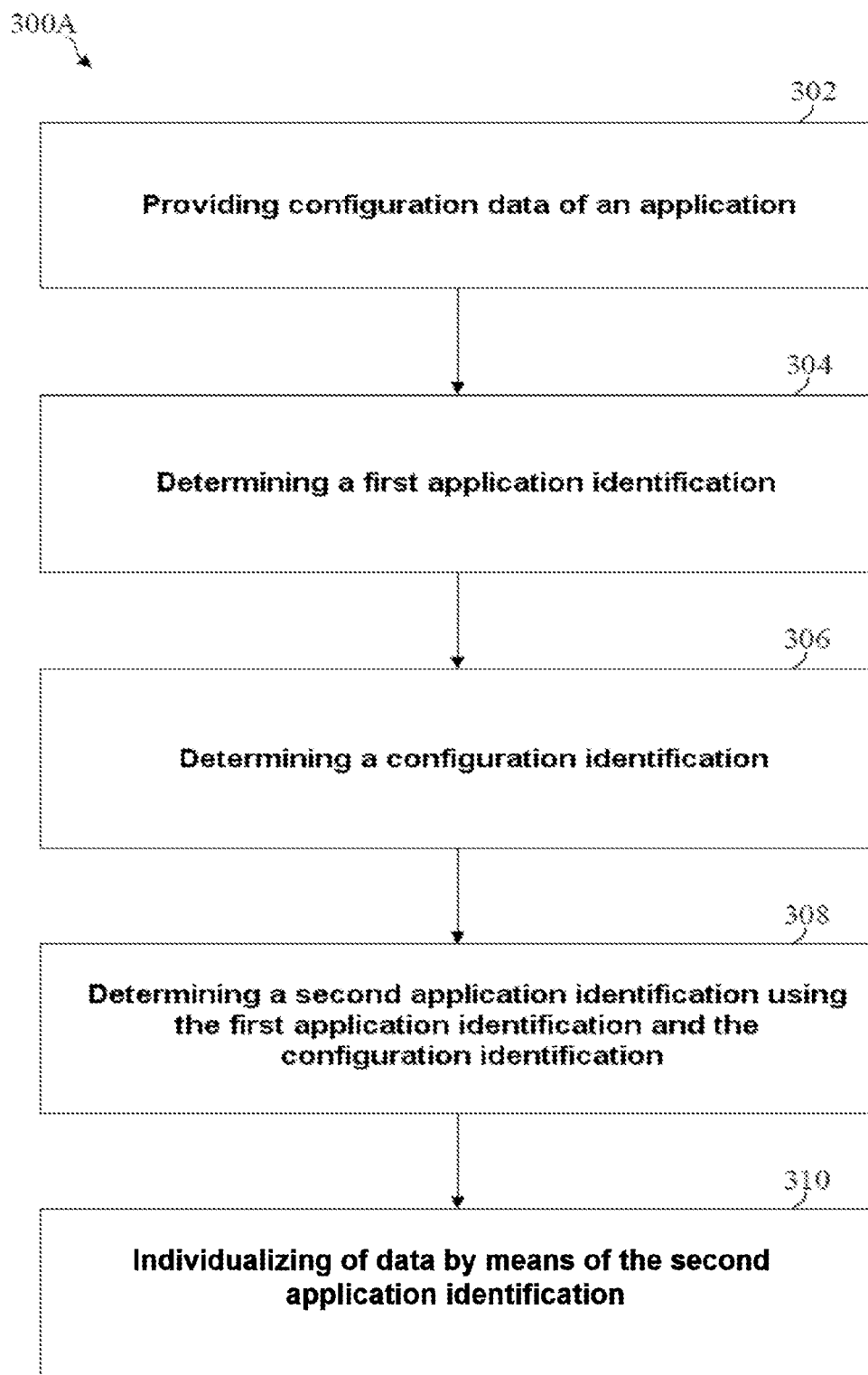

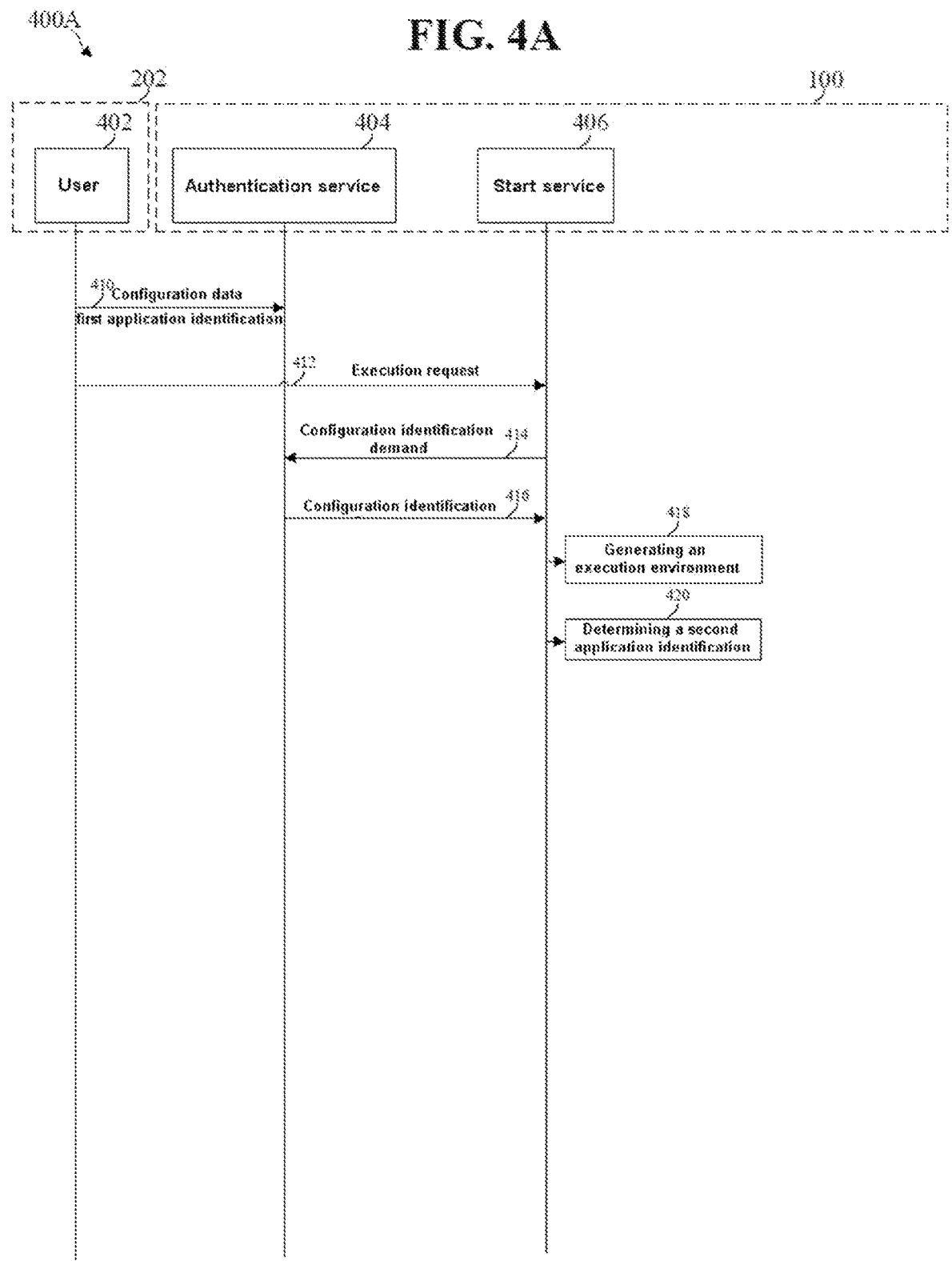

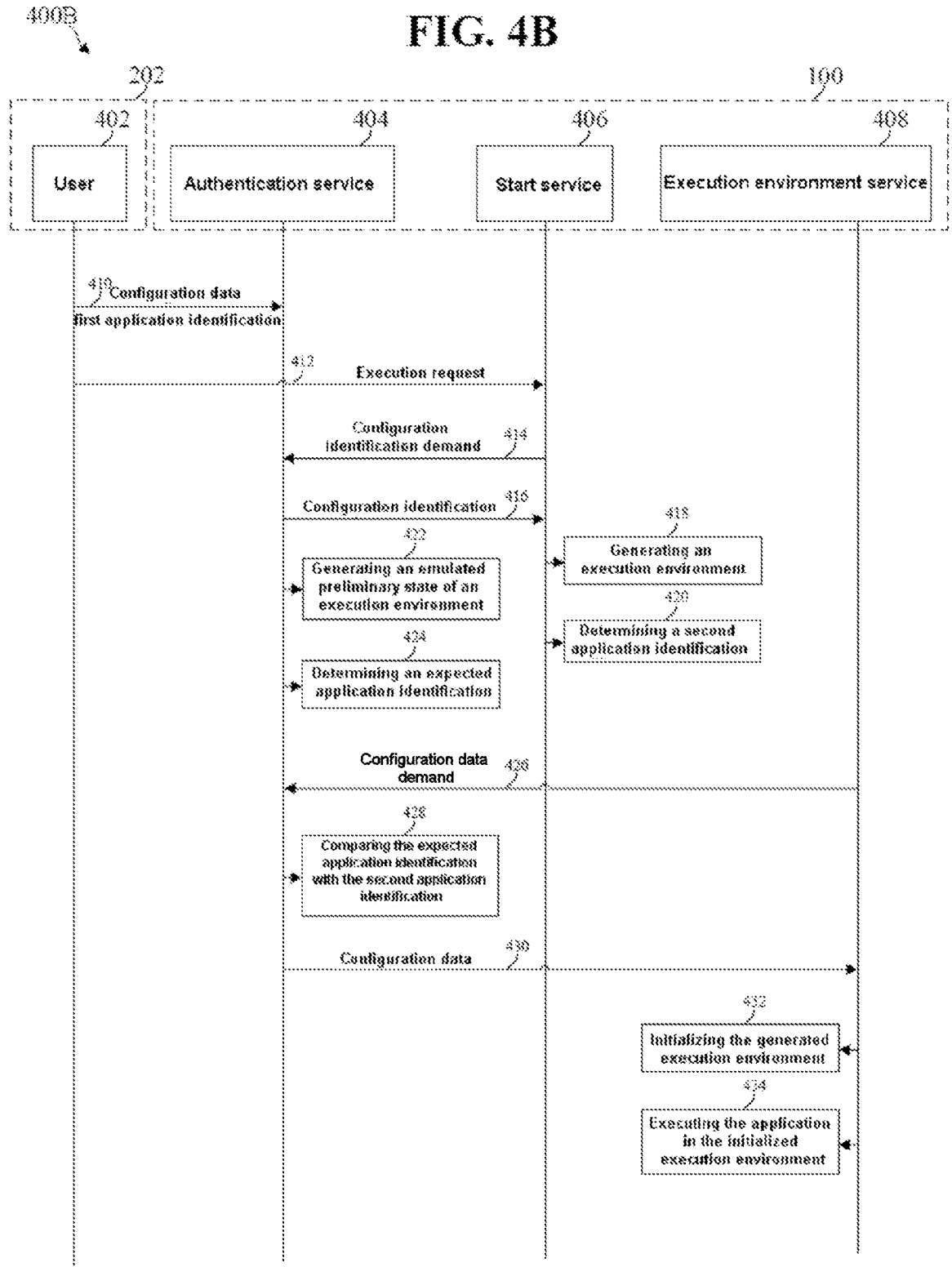

DEVICE AND METHOD FOR COMPUTER-AIDED PROCESSING OF DATA

Various embodiments relate to a device and a method for computer-aided processing of data.

In general, in the hierarchical security model, the operating system core is protected against user applications. However, the operating system core can change the behavior and the data of a user application. Applications can be executed in a trusted execution environment, as a result of which the applications can be executed in a manner protected from the operating system core, for example access of the operating system core to the behavior and/or the data of the application can be restricted. However, attackers can gain access to trusted execution environments by means of various methods and manipulate them, as a result of which the attacker can access, for example, computer systems on which the application is executed (for example by means of malware). Therefore, it may be necessary to generate a trusted execution environment that is protected against manipulation. For example, it may be necessary to execute an application in a trusted execution environment, wherein an attack on the behavior and/or the data of the application by an operating system core is restricted, preferably prevented.

According to various embodiments, a device and a method for computer-aided processing of data are provided, by means of which data can be processed in a protected trusted execution environment. Furthermore, according to various embodiments, a device and a method for computer-aided processing of data are provided by means of which a computer system can be protected from manipulations and/or attacks. According to various embodiments, a device and a method for computer-aided processing of data are provided by means of which access to the behavior and/or the data of an executed application by an operating system core is restricted, preferably prevented.

According to various embodiments, a method for computer-aided processing of data includes: providing configuration data of an application, determining a first application identification, wherein the first application identification is assigned to the application, determining a configuration identification, wherein the configuration identification is assigned to the configuration data of the application, individualizing the data by means of a second application identification, wherein the second application identification is determined using the first application identification and the configuration identification.

The method having the features of independent claim 1 forms a first example.

An application can be any type of algorithm that can be executed by means of a processor.

Individualization of data by means of a second application identification can lead to data being able to be assigned unambiguously based on the second application identification. For example, the data of an application and configuration data of the application can be assigned and the data of the application and the configuration data of the application can be identified using the second application identification. For example, an instance of an execution environment can be generated by means of the individualization. An instance can be clearly distinguished, for example, from other instances of an execution environment.

The method can also include the determination of an expected application identification. The expected application identification can be determined using the first application identification and the configuration identification. The method can include the comparison of the expected application identification with the second application identification. If the expected application identification corresponds to the second application identification, the method can include the execution of the application using the configuration data. For example, a manipulated execution environment can be identified by means of the comparison of the expected application identification with the second application identification. For example, a change in the data of the application and/or a change in the configuration data of the application can be identified. This consequently has the effect that an execution of an application in a changed (for example manipulated) execution environment can be prevented. Accordingly, access by changed execution environments to the configuration data can be prevented, as a result of which the execution of the application can be prevented, for example. The features described in this paragraph in combination with the first example form a second example.

The method can also include the encryption of individualized data. The individualized data can be encrypted by means of a key, for example. The features described in this paragraph in combination with the first example or the second example form a third example.

The individualization of the data by means of a second application identification can generate an execution environment. The feature described in this paragraph in combination with one or more of the first example to the third example forms a fourth example.

The execution of the application can include the execution of the application in the execution environment using the configuration data. The feature described in this paragraph in combination with the fourth example forms a fifth example.

The configuration data can include runtime configuration data and/or application configuration data. The features described in this paragraph in combination with one or more of the first example to the fifth example form a sixth example.

The runtime configuration data can include configuration data of the execution environment. The features described in this paragraph in combination with the fifth example and the sixth example form a seventh example.

The runtime configuration data can include file system marker configuration data, network marker configuration data and/or configuration data for secret injection. The configuration data for secret injection can include one or more of: at least one symmetric key (for example a binary symmetric key), at least one alphanumeric password, at least one asymmetric key pair (for example RSA, for example elliptic curves etc.), at least one X.509 certificate, user-specific data etc. The features described in this paragraph in combination with the sixth example or the seventh example form an eighth example.

The application configuration data can include program line arguments and/or environment variables. The features described in this paragraph in combination with one or more of the sixth example to the eighth example form a ninth example.

The provision of configuration data of the application can include the reception of the configuration data of the application by an authentication service. The features described in this paragraph in combination with one or more of the first example to the ninth example form a tenth example.

The provision of configuration data of the application can also include the storing of the configuration data of the application by the authentication service. The features described in this paragraph in combination with the tenth example form an eleventh example.

The provision of configuration data of the application can also include the reception of a first application identification, assigned to the application, by the authentication service. The provision of configuration data of the application can also include the storing of the first application identification in connection with the assigned configuration data of the application by the authentication service. The features described in this paragraph in combination with the tenth example or the eleventh example form a twelfth example.

The configuration data can be transmitted to the authentication service by a user. The feature described in this paragraph in combination with the twelfth example forms a thirteenth example.

The first application identification can be transmitted to the authentication service by the user in connection with the configuration data of the application. The feature described in this paragraph in combination with the twelfth example or the thirteenth forms a fourteenth example.

The transmission of the configuration data and/or the transmission of the first application identification to the authentication service can include the use of a transport layer security encryption protocol. The features described in this paragraph in combination with the thirteenth example or the fourteenth example form a fifteenth example.

The transport layer security encryption protocol can include the use of an asymmetric key pair. The feature described in this paragraph in combination with the fifteenth example forms a sixteenth example.

The authentication service can be executed in a trusted execution environment. The feature described in this paragraph in combination with one or more of the tenth example to the sixteenth example forms a seventeenth example.

The authentication service can be a central authentication service. The feature described in this paragraph in combination with one or more of the tenth example to the seventeenth example forms a eighteenth example.

The authentication service can be executed on an authentication server. The feature described in this paragraph in combination with one or more of the tenth example to the eighteenth example forms a nineteenth example.

The determination of the first application identification can include the reception of an execution request of the application by a start service. The determination of the first application identification can also include the determination of the first application identification using the execution request by the start service. The features described in this paragraph in combination with one or more of the tenth example to the nineteenth example form a twentieth example.

The determination of the configuration identification can include the transmission of a configuration identification demand from a start service to the authentication service. The configuration identification demand can include the first application identification. The determination of the configuration identification can include the transmission of the configuration identification by way of the authentication service to the start service in response to the configuration identification demand. The use of an authentication service, such as a central authentication service (CAS), for example, can protect a system from man-in-the-middle attacks. The authentication service can generate by way of example the configuration identification, for example using the configuration data. Consequently, for example, only the authentication service can assign the configuration identification to the configuration data. The features described in this paragraph in combination with the twentieth example form a twenty-first example.

The configuration identification can include a first authentication identification and/or a second authentication identification. The features described in this paragraph in combination with one or more of the tenth example to the twenty-first example form a twenty-second example.

The first authentication identification can be assigned to the configuration data assigned to the first application identification. The feature described in this paragraph in combination with the twenty-second example forms a twenty-third example.

The first authentication identification can include a random value. The feature described in this paragraph in combination with the twenty-second example or the twenty-third example forms a twenty-fourth example.

The second authentication identification can be assigned to the authentication service. If the configuration data, and thus for example the second authentication identification, are added to the first application identification, a system is protected from a communication with a fake authentication service (for example by means of a man-in-the-middle attack). For example, during the communication with another service, such as a start service, for example, the authentication service can determine whether said service includes a second application identification that includes the second authentication identification assigned to the authentication service. The feature described in this paragraph in combination with one or more of the twenty-second example to the twenty-fourth example forms a twenty-fifth example.

The communication with the authentication service can include a transport layer security encryption protocol. The feature described in this paragraph in combination with one or more of the tenth example to the twenty-fifth example forms a twenty-sixth example.

The transport layer security encryption protocol can include the use of an asymmetric key pair with a public key and a private key. The feature described in this paragraph in combination with the twenty-sixth example forms a twenty-seventh example.

The second authentication identification can include a certificate assigned to the public key. The certificate can include a hash value. The features described in this paragraph in combination with the twenty-seventh example form a twenty-eighth example.

The determination of the second application identification can include the addition of the configuration identification to the first application identification. The feature described in this paragraph in combination with one or more of the first example to the twenty-eighth example forms a twenty-ninth example.

The first application identification and the configuration identification can each include a hash value. The second application identification can be determined using the hash value of the first application identification and the hash value of the configuration identification. The features described in this paragraph in combination with one or more of the first example to the twenty-ninth example form a thirtieth example.

The hash value of the first application identification and/or the hash value of the second application identification can be generated using a hash function. The hash function can be an SHA-256 hash function. Due to the use of a hash function, each change in the data and/or the configuration data of an application leads to a changed hash value. This has the effect that a change in the data and/or the configuration data of an application can be identified. The features described in this paragraph in combination with the thirtieth example form a thirty-first example.

The individualization of the data by means of the second application identification can include the individualization of the data by means of the hash value of the second application identification. The features described in this paragraph in combination with the thirtieth example or the thirty-first example form a thirty-second example.

The generation of an execution environment can include the generation of a preliminary state of the execution environment. The generation of an execution environment can include the generation of the execution environment using the preliminary state of the execution environment. The features described in this paragraph in combination with one or more of the first example to the thirty-second example form a thirty-third example.

The determination of the expected application identification can include the emulation of the generation of an execution environment using the first application identification and the configuration identification. The determination of the expected application identification can include the determination of the expected application identification using the emulated execution environment. The features described in this paragraph in combination with one or more of the fourth example to the thirty-third example form a thirty-fourth example.

The emulation of the generation of the execution environment can include the generation of an emulated preliminary state of the execution environment. The emulation of the generation of the execution environment can include the generation of the emulated execution environment using the preliminary state of the execution environment and the configuration identification. The features described in this paragraph in combination with the thirty-third example and the thirty-fourth example form a thirty-fifth example.

The execution of the application in the execution environment using the configuration data can include the transmission of a configuration data demand from the execution environment service to the authentication service. The configuration data demand can include the second application identification. If the expected application identification corresponds to the second application identification, the execution of the application in the execution environment can also include the transmission of the configuration data by way of the authentication service to the execution environment service in response to the configuration data demand. The execution of the application in the execution environment can include the execution of the application by means of the execution environment service in the execution environment using the configuration data of the execution environment. The features described in this paragraph in combination with one or more of the fourth example to the thirty-fifth example form a thirty-sixth example.

If the expected application identification does not correspond to the second application identification, the method can also include the rejection of the configuration data demand. The feature described in this paragraph in combination with the thirty-sixth example forms a thirty-seventh example.

If the expected application identification does not correspond to the second application identification, the method can also include the emission of a security warning. The feature described in this paragraph in combination with the thirty-sixth example or the thirty-seventh example forms a thirty-eighth example.

The execution of the application in the execution environment using the configuration data can include the initialization of the generated execution environment using the configuration data. The execution of the application in the execution environment can also include the execution of the application in the initialized execution environment. The features described in this paragraph in combination with one or more of the thirty-sixth example to the thirty-eighth example form a thirty-ninth example.

The communication with the authentication service can include a transport layer security encryption protocol. The features described in this paragraph in combination with one or more of the tenth example to the thirty-ninth example form a fortieth example.

A transport layer security encryption protocol can be used for the communication between the start service and the authentication service. The features described in this paragraph in combination with one or more of the twentieth example to the fortieth example form a forty-first example.

A transport layer security encryption protocol can be used for the communication between the execution environment service and the authentication service. The transport layer security encryption protocol can include the use of an asymmetric key pair with a public key and a private key. A respective certification process can be carried out before the communication using a transport layer security encryption protocol. The features described in this paragraph in combination with one or more of the thirty-sixth example to the forty-first example form a forty-second example.

A device can be configured to execute the method according to one or more of the first example to the forty-second example. The device having the features described in this paragraph forms a forty-third example.

A system for computer-assisted processing of data can include a device having the features of the forty-third example. The device can include at least one processor. The system can include a user interface. The user interface can be configured to receive an input. The at least one processor can be configured to execute the method having the features of the first example to the forty-second example in response to the input received by the user interface. The system having the features described in this paragraph forms a forty-fourth example.

A computer program product can store program instructions, which execute the method having the features of the first example to the forty-second example when said program instructions are executed. The computer program product having the features described in this paragraph forms a forty-fifth example.

The figures show:

FIG. 3A shows a method for computer-aided processing of data according to various embodiments;

FIG. 4A shows a detailed method for computer-aided processing of data according to various embodiments;

FIG. 4B shows a detailed method for computer-aided processing of data according to various embodiments.

In the detailed description that follows, reference is made to the appended drawings, which form part of this description and in which specific embodiments in which the invention can be executed are shown for purposes of illustration.

The term "processor" can be understood as any type of entity that permits the processing of data or signals. The data or signals can be handled, for example, according to at least one (that is to say one or more than one) specific function that is executed by the processor. A processor can include or be formed from an analog circuit, a digital circuit, a mixedsignal circuit, a logic circuit, a microprocessor, a central processing unit (CPU), a graphics processing unit (GPU), a digital signal processor (DSP), a programmable gate array (FPGA), an integrated circuit or any combination thereof. Any other type of implementation of the respective functions described in more detail below can also be understood as a processor or logic circuit. It is understood that one or more of the method steps described in detail here can be executed (for example realized) by a processor, by way of one or more specific functions executed by the processor. The processor can therefore be configured to carry out one of the methods described herein or the components thereof for information processing.

Attackers can change, for example manipulate, the behavior and/or the data of an application executed, for example, in a trusted execution environment by means of various methods, as a result of which, for example, a computer system on which the application is executed can be infected with malware.

Various embodiments relate to a device and a method for computer-aided processing of data by means of which manipulation of an executed application is prevented, as a result of which, for example, a computer system can be protected against manipulations and/or attacks.

Figure 1:
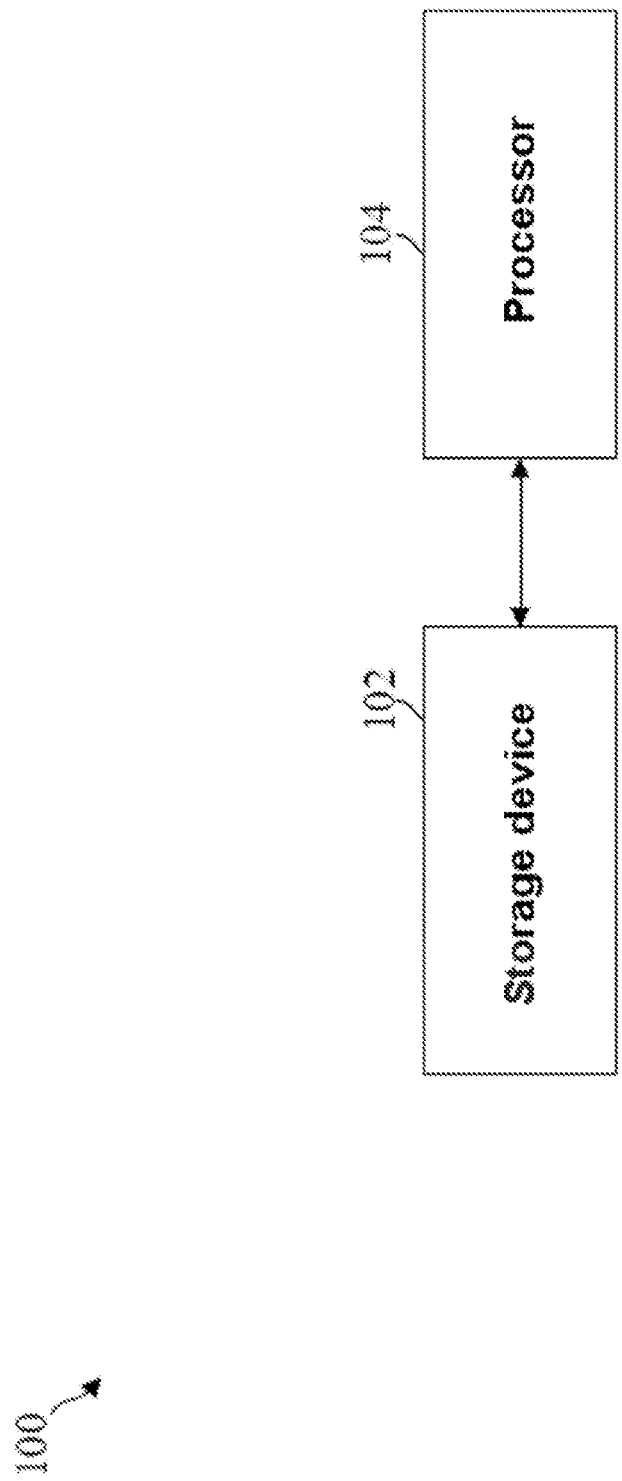
FIG. 1 shows a device according to various embodiments.

FIG. 1 shows a device 100 according to various embodiments. The device 100 can include a storage device 102. The storage device 102 can include at least one memory. The memory can be used, for example, in the processing carried out by a processor. A memory used in the embodiments can be a volatile memory, for example a DRAM (dynamic random access memory), or a non-volatile memory, for example a PROM (programmable read-only memory), an EPROM (erasable PROM), an EEPROM (electrically erasable PROM) or a flash memory, such as, for example, a storage unit with floating gate, a charge trapping storage unit, an MRAM (magnetoresistive random access memory) or a PCRAM (phase-change random access memory). The storage device 102 can be configured to store code (for example program code) of an application module. The code of the application module can be processed, for example, by a processor in order to execute an application. The storage device 102 can be configured to store data. The data can be data assigned to an application, for example. The data can be processed, for example, by means of an application when this is executed by a processor.

The device 100 can also include at least one processor 104. The processor 104 can, as described above, be any type of circuit, that is to say any type of logic-implemented entity. In various embodiments, the processor 104 is configured to execute an application.

Figure 2:
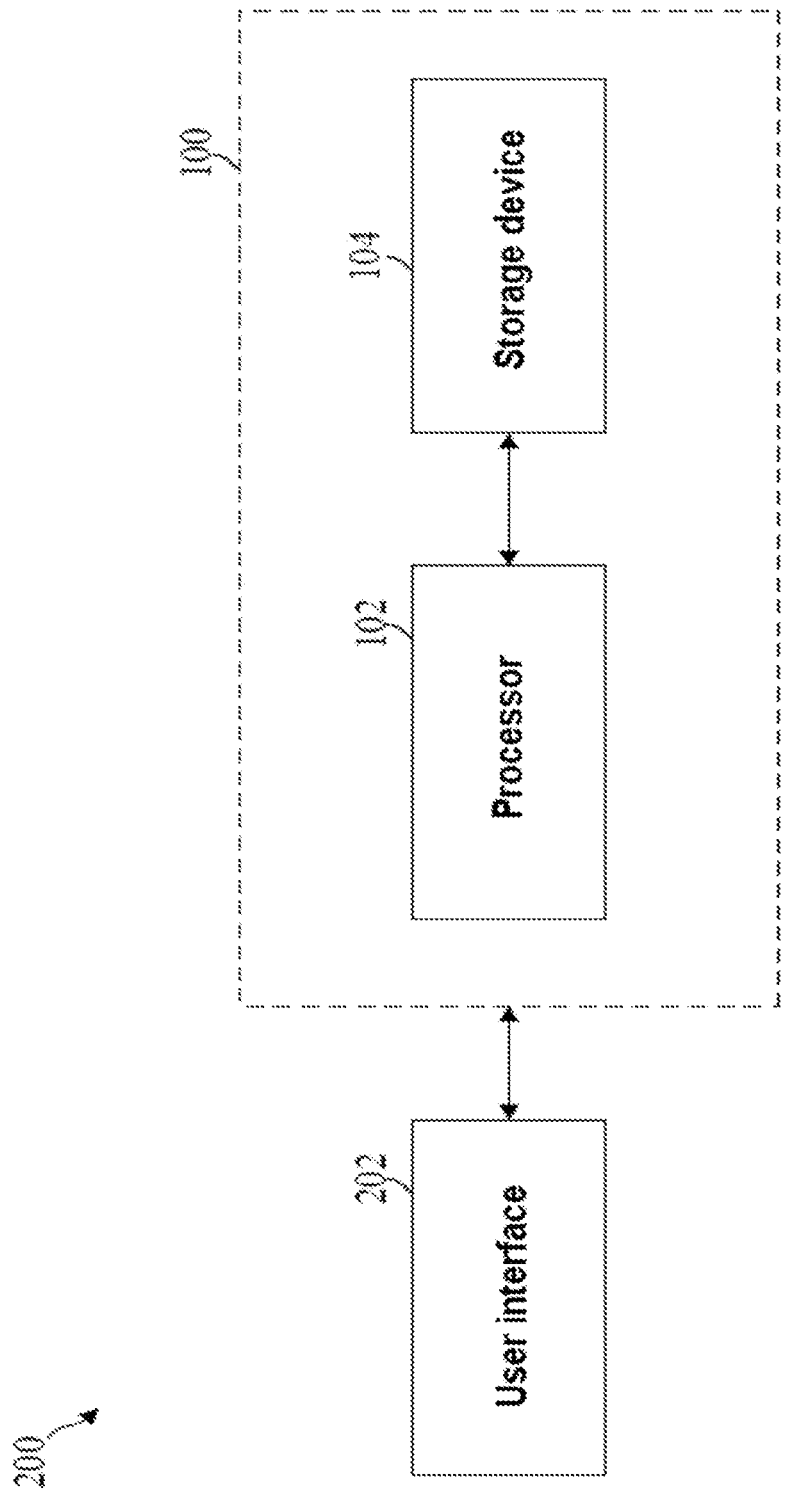
FIG. 2 shows a system according to various embodiments.

FIG. 2 shows a system 200 according to various embodiments. The system 200 can include the device 100. The system 200 can also include a user interface 202. The user interface 202 can be configured to enable a person, such as a user, for example, to interact with the device 100. For example, the user interface 202 can include an input device. The input device can be configured to receive an input by a user. The user interface 202 can be configured to provide the device 100 with the input of the user. The input of the user can be, for example, a request for data processing (for example for executing an application). The processor 104 can be configured to process the request for data processing (for example the request for executing an application). The processor 104 can be configured, for example, to carry out one of the methods described in the following text.

FIG. 3A shows a method 300A for computer-aided processing of data according to various embodiments. The method 300A can include the provision of configuration data of an application (in 302). The configuration data can include runtime configuration data and/or application configuration data. The runtime configuration data can include configuration data of an execution environment (for example data describing a configuration of an execution environment). The runtime configuration data can include file system marker configuration data, network marker configuration data and/or configuration data for a secret injection. The configuration data for a secret injection can include one or more of: at least one symmetric key (for example a binary symmetric key), at least one alphanumeric password, at least one asymmetric key pair (for example RSA, elliptic curves etc.), at least one X509 certificate and/or user-specific data. The user-specific data can be data specified by a user. The application configuration data can include program line arguments and/or environment variables.

The method 300A can also include the determination of a first application identification (in 304). The first application identification can be assigned to the application. The method 300A can include the determination of a configuration identification (in 306). The configuration identification can be assigned to the configuration data of the application. The method 300A can also include the determination of a second application identification (in 308). The second application identification can be determined, for example, using the first application identification and the configuration identification. The second application identification can be determined, for example, by adding the configuration identification to the first application identification. According to various embodiments, the first application identification and the configuration identification can each include a hash value. The hash value of the first application identification and/or the hash value of the configuration identification can be generated, for example, by means of a hash function. The hash function can be an SHA256 hash function, for example. The second application identification can be determined, for example, using the hash value of the first application identification and the hash value of the configuration identification. The second application identification can be determined, for example, by adding the hash value of the configuration identification to the hash value of the first application identification.

The method 300A can include the individualization of data by means of the second application identification (in 310). The individualization of data can include, for example, the individualization of the application. The individualization of data can include, for example, an integrity measurement. The data can be individualized, for example, by means of the hash value of the second application identification. The individualization of the data by means of the second application identification can generate an execution environment.

Figure 3B:
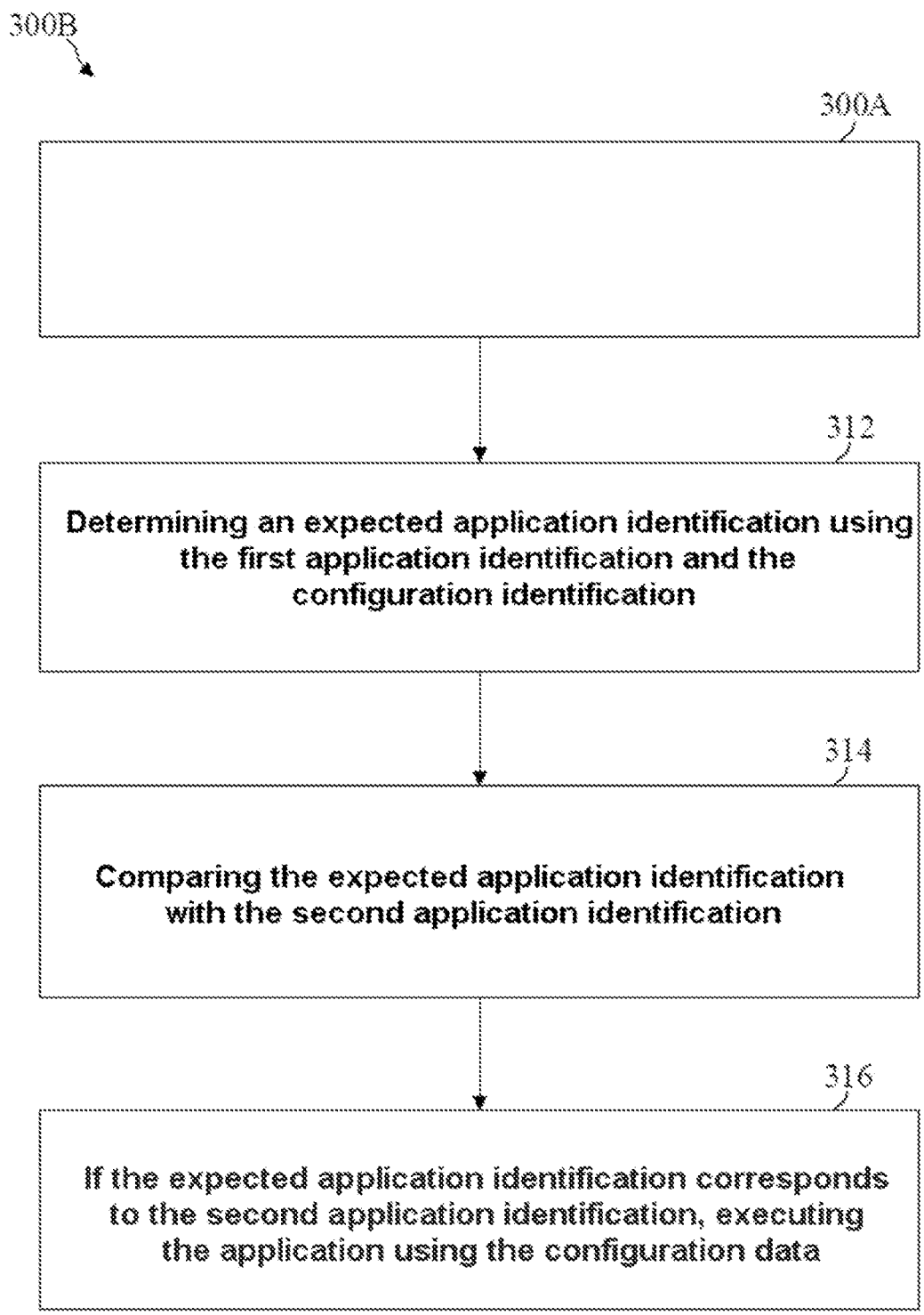
FIG. 3B shows a method for computer-aided processing of data according to various embodiments.

FIG. 3B shows a method 300B for computer-aided processing of data according to various embodiments. The method 300B can include the method 300A. The method 300B can also include the determination of an expected application identification (in 312). The expected application identification can be determined using the first application identification and the configuration identification. The method 300B can also include the comparison of the expected application identification with the second application identification (in 314). If the expected application identification corresponds to the second application identification, the method 300B can include the application being executed using the configuration data (in 316). If the expected application identification does not correspond to the second application identification, the method 300B can include the application not being executed. If the expected application identification does not correspond to the second application identification, the method 300B can include a security warning being output. The method 300B can also include encrypting the individualized data by means of a key (for example a disposable key).

FIG. 4A shows a detailed method 400A for computer-aided processing of data according to various embodiments. The method 400A can be a detailed method of the method 300A. The method 400A can be carried out by means of the system 200. For example, a user 402 can interact with the user interface 202. The at least one processor 104 can implement an authentication service 404. The authentication service 404 can be executed in a trusted execution environment. The authentication service 404 can be a central authentication service (CAS). The authentication service 404 can be executed on an authentication server, for example. The at least one processor 104 can implement a start service 406.

The user 402 can input an input for executing an application, for example by means of the user interface 402. According to various embodiments, configuration data can be provided by means of the input for executing an application. As described above, the configuration data can include runtime configuration data and/or application configuration data. The configuration data can be transmitted (in 410) to the authentication service 404 by means of the user interface (for example by the user). The authentication service 404 can receive the configuration data of the application and can store the configuration data of the application, for example can store it in the storage device 102. According to various embodiments, the authentication service 404 can also receive (in 410) the first application identification (for example by means of the user interface 202). The authentication service 404 can be configured to store the first application identification, for example in the storage device 102. The authentication service 404 can store the first application identification in connection with the assigned configuration data.

The configuration data and/or the first application identification can be transmitted using a transport layer security encryption protocol (a TLS encryption protocol). A TLS encryption protocol, as described here, can use an asymmetric key pair (for example having a public key and a private key). The respective public key can be exchanged, for example, before the transmission of the respective data (such as the configuration data, for example) between the respective elements described in the following text (for example services, for example of a user interface).

The start service 406 can be started, for example, in response to the input of the user 402. The start service 406 can receive an execution request for executing an application (in 412). According to various embodiments, the execution request can be transmitted in response to the input for executing an application by way of the user 402 (for example by means of the user interface 202). The start service 406 can be configured to determine the first application identification using the execution request. For example, the execution request can include the first application identification.

The start service 406 can transmit a configuration identification demand to the authentication service 404 (in 414). The start service 406 can transmit the configuration identification demand to the authentication service 404 for demanding a configuration identification from the authentication service 404. The configuration identification demand can include the first application identification assigned to the application. The demanded configuration identification can be an identification (for example an identifier) for the configuration data of the application.

The authentication service 404 can be configured to transmit a configuration identification to the start service 406 in response to the configuration identification demand (in 416). The configuration identification can include a first authentication identification. The first authentication identification can be assigned to the configuration data assigned to the first application identification of the application. The first authentication identification can include a random value. The authentication service 404 can be configured, in response to the configuration identification demand, to generate a first authentication identification assigned to the configuration data of the application (such as a random value, for example) and to transmit the generated first authentication identification to the start service 406. The authentication service 404 can be configured to store the first authentication identification in connection with the configuration data, for example to store it in the storage device 102. A random value can clearly be assigned to the configuration data and the authentication service can store the random value in connection with the configuration data. The configuration identification can include a second authentication identification. The second authentication identification can be assigned to the authentication service 404. The second authentication identification can clearly include an identifier for the authentication service 404. For example, the second authentication identification can include a certificate of the authentication service. The communication between the start service 406 and the authentication service 404 can include a transport layer security encryption protocol, as described above, which uses, for example, an asymmetric key pair (having a public key and a private key). The certificate can be assigned to the public key of the authentication service 404. The certificate can include a hash value.

The start service 406 can be configured to generate (in 418) an execution environment in response to the reception of the configuration identification (for example the first authentication identification and/or the second authentication identification). According to various embodiments, the first authentication identification (for example the random value) can be assigned to the execution environment one-to-one (for example a first authentication identification is assigned to precisely one execution environment). For example, a multiplicity of execution environments can be generated for a multiplicity of applications by means of the method 400A, wherein a first authentication identification can be assigned one-to-one to each execution environment of the multiplicity of execution environments (for example a bijective assignment of the multiplicity of execution environments and the multiplicity of first authentication identifications). This has the effect, for example, that the authentication service 404 can assign a first authentication identification one-to-one to an execution environment of the multiplicity of execution environments.

The start service 406 can make it possible for the generated execution environment to access system functions, for example. The start service 406 can be configured to determine a second application identification (in 420). The second application identification can be assigned to the generated execution environment. The start service 406 can determine the second application identification, for example, using the first application identification and the configuration data. The second application identification can be determined, for example, by adding the configuration identification to the first application identification. According to various embodiments, the first application identification and the configuration identification can each include a hash value. The hash value of the first application identification and/or the hash value of the configuration identification can be generated, for example, by means of a hash function. The hash function can be an SHA-256 hash function, for example. The second application identification can be determined, for example, using the hash value of the first application identification and the hash value of the configuration identification. The second application identification can be determined, for example, by adding the hash value of the configuration identification to the hash value of the first application identification. The second application identification can clearly be an identifier of the execution environment generated in 418. The second application identification can clearly define a behavior of an application and/or configuration data of the application.

For example, the data can be individualized by means of the second application identification. The second application identification can clearly be assigned one-to-one to an application and to the configuration data of the application.

FIG. 4B shows a detailed method 400B for computer-aided processing of data according to various embodiments. The method 400B can include the method 400A, wherein the at least one processor 104 can also implement an execution environment service 408.

The start service 406 can be configured to start the execution environment service 408. The start service 406 can be configured, for example, to start the execution environment service 408 in response to the generation of the execution environment. According to various embodiments, the execution environment service 408 can be executed in the execution environment. The configuration data are necessary to execute the application in the execution environment. The execution environment service 408 can carry out, for example, a certification with the authentication service 404. The execution environment service 408 can transmit, for example, the second application identification of the generated execution environment to the authentication service 404 in the course of the certification.

An execution environment can be generated, for example, in such a way that a preliminary state of the execution environment is generated and that the execution environment is generated using the preliminary state.

The authentication service 404 can be configured to emulate an execution environment. For example, the authentication service 404 can include an emulation module, which can be configured to emulate an execution environment. The authentication service 404 can be configured to generate an emulated preliminary state of an execution environment (in 422). The emulated preliminary state can be assigned to the execution environment generated in 418. The emulated preliminary state can be generated using the first application identification. The authentication service 404 can be configured to generate an emulated execution environment using the emulated preliminary state of the execution environment and the configuration identification that is assigned to the first application identification of the application. The authentication service 404 can be configured to determine an expected application identification (in 424). The authentication service 404 can determine the expected application identification using the emulated execution environment. The expected application identification can be assigned to the emulated execution environment. The expected application identification can be a hash value of the emulated execution environment.

The authentication service 404 can determine the expected application identification in response to the transmission of the configuration identification (in 414) to the start service 406. The authentication service 404 can determine the expected application identification in response to a communication between the execution environment service 408 and the authentication service 404.

The execution environment service 408 can transmit a configuration data demand for demanding the configuration data of the application to the authentication service 404 (in 426). The configuration data demand can include the second application identification, for example. According to various embodiments, the authentication service 404 can determine the expected application identification in response to the transmission of the configuration data demand. The communication between the execution environment service 408 and the authentication service 404 can include a transport layer security encryption protocol as described above.

The authentication service 404 can be configured to compare the expected application identification with the second application identification (in 428).

If the expected application identification corresponds to the second application identification, the authentication service 404 can be configured to transmit the configuration data of the application to the execution environment service 408 in response to the configuration data demand (in 430). If the expected application identification does not correspond to the second application identification, the authentication service 404 can be configured to reject the configuration data demand of the execution environment service 408. If the expected application identification does not correspond to the second application identification, the authentication service 404 can be configured to output a security warning, for example to output it to the user 402 by means of the user interface 202.

The execution environment service 408 can be configured to execute the application in the application environment using the received configuration data. The execution environment service 408 can be configured to initialize (in 432) the execution environment generated in 418. The execution environment service 408 can be configured to initialize the execution environment generated in 418 using the configuration data, for example to initialize said execution environment in response to the reception of the configuration data by the authentication service 404. The execution environment service 408 can be configured to execute the application in the initialized execution environment (in 434). According to various embodiments, an execution environment generated in 418 can be further changed and an initialized execution environment can no longer be changed.

The invention claimed is:

1. A method for computer-aided executing of an application in a trusted execution environment, the method comprising:
providing configuration data for executing the application;
transmitting the configuration data to an authentication service;
determining a first application identification, wherein the first application identification is assigned to the application, wherein determining the first application identification comprises receiving of an execution request of the application by a start service, wherein the start service determines the first application identification is determined using the execution request;

the start service transmitting a configuration identification demand to the authentication service for demanding a configuration identification from the authentication service;

in response to receiving the configuration identification demand, the authentication service determining the configuration identification comprising a first authentication identification, which is assigned to the configuration data of the application, and a second authentication identification, which is assigned to the authentication service, and transmitting the configuration identification to the start service;

the start service generating the trusted execution environment in response to receiving the configuration identification, wherein the first authentication identification is assigned to the trusted execution environment;

individualizing the data by means of a second application identification, wherein the second application identification is determined by the start service using the first application identification and the configuration identification, wherein the second application identification is an identifier of the generated trusted execution environment, and wherein the second application identification is assigned to the application and the configuration data of the application;

the start service starting an execution environment service being executed in the trusted execution environment;

the execution environment service transmitting a configuration data demand to the authentication service for demanding the configuration data for executing the application, wherein the configuration data demand comprises the second application identification;

in response to receiving the configuration data demand, the authentication service determining an expected application identification using the first application identification and the configuration identification, comparing the expected application identification with the second application identification and, if the expected application identification corresponds to the second application identification, transmitting the configuration data to the execution environment service; and the execution environment service executing the application in the trusted execution environment using the configuration data.

2. The method as claimed in claim 1, wherein the determination of the expected application identification comprises:

emulating the generation of an execution environment using the first application identification and the configuration identification;

determining the expected application identification using the emulated execution environment.

3. The method as claimed in claim 2, wherein the emulation of the generation of the execution environment comprises:

generating an emulated preliminary state of the execution environment;

generating the emulated execution environment using the preliminary state of the execution environment and the configuration identification.

4. The method as claimed in claim 1,
wherein the determination of the second application identification comprises:
adding the configuration identification to the first application identification.

5. The method as claimed in claim 1,
wherein the first application identification and the configuration identification each comprise a hash value; and
wherein the second application identification is determined using the hash value of the first application identification and the hash value of the configuration identification.

6. The method as claimed in claim 5,
wherein the hash value of the first application identification and/or of the second application identification is generated using a hash function.

7. The method as claimed in claim 5,
wherein the individualization of the data by means of the second application identification comprises:
individualizing the data by means of the hash value of the second application identification.

8. A device, which is configured to execute the method as claimed in claim 1.

9. A system for computer-aided processing of data, comprising:
a device as claimed in claim 8, wherein the device comprises at least one processor;
a user interface, which is configured to receive an input;
wherein the at least one processor is configured to execute the method as claimed in claim 1 in response to the input received by the user interface.

10. A computer program product, which stores program instructions, which execute the method as claimed in claim 1 when said program instructions are executed.

* * * * *